UNITED STATES PATENT OFFICE.

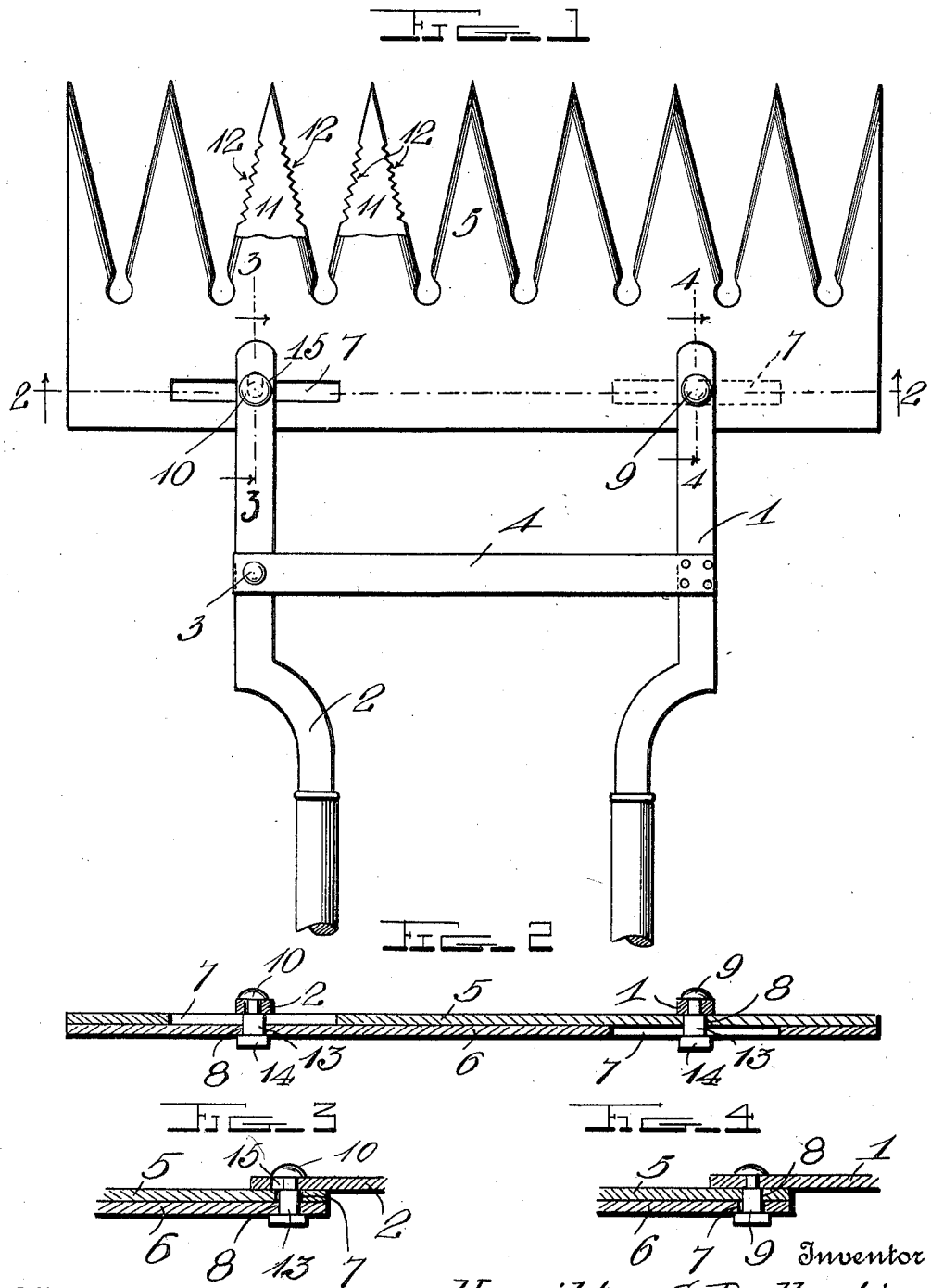

HAMILTON SMITH BALLANTINE, OF GERMANTOWN, PENNSYLVANIA.

HEDGE-SHEARS.

998,828.

Specification of Letters Patent.

Patented July 25, 1911.

Application filed November 2, 1909. Serial No. 525,908.

*To all whom it may concern:*

Be it known that I, HAMILTON SMITH BALLANTINE, a citizen of the United States, residing at Germantown, in the county of Philadelphia and State of Pennsylvania, have invented certain new and useful Improvements in Hedge-Shears; and I do declare the following to be a full, clear, and exact description of the invention, such as will enable others skilled in the art to which it appertains to make and use the same.

This invention relates to new and useful improvements in hedge shears and has for its object to provide a simple and efficient device of this character which is well adapted for the purposes intended.

With this and other objects in view, the invention consists of certain novel features of construction, combination and arrangement of parts as will be more fully described and particularly pointed out in the appended claim.

In the accompanying drawings, Figure 1 is a plan view of a pair of hedge shears embodying my improvements, with a portion of one of the teeth of the upper or stationary cutting blade broken away to show one of the teeth of the lower or movable cutting blade. Fig. 2 is a longitudinal section taken on line 2—2 Fig. 1; Fig. 3 is a transverse section taken on line 3—3 of Fig. 1, and Fig. 4 is a similar view taken on line 4—4 of said figure.

Referring to the drawings for a more particular description of the invention the numeral 1 indicates the fixed handle member and 2 the movable or pivoted handle member which is pivoted upon a bolt 3 to the outer end of the lateral arm 4 extending from the fixed handle member.

The cutting part of the shears comprises a pair of corresponding flat cutting blades 5 and 6 respectively, each of which is provided in one end with a longitudinal bolt receiving slot 7 and in its opposite end a transverse bolt receiving aperture 8, and said shears are arranged in position with the slot of one blade in registration with the aperture of the other blade.

A bolt 9 whose head is at the top as seen in Fig. 2, passes downward through the fixed handle member 1, thence through a sleeve 13 which is as long as the thickness of the two blades 5 and 6 and stands in the aperture 8 of one and the slot 7 of the other, and receives a nut 14 at its lower end which when set up tight against the sleeve will permit the lower blade to move between it and the upper blade 5. In similar manner another bolt 10 passes through the movable handle member 2, thence through a sleeve 13 which is as long as the thickness of the two blades 5 and 6 and stands in the slot 7 of one and the aperture 8 of the other, and receives a nut 14 at its lower end which when set up tight against the lower blade 6 will permit the upper blade 5 to move between the lower blade and the arm 2. Aside from the reversed positions of the slots 7, it will be observed from Fig. 3 that the only material difference between these two pivotal connections is that the movable handle 2 has a slot 15 through which the bolt 10 projects, and this slot permits said handle to turn pivotally on its bolt 3 and to both turn and slide on the bolt 10. By this construction when the movable handle member is actuated by the operator the fixed cutting blade remains stationary while the other blade is moved alternately in opposite directions with respect to the stationary blade.

The side edges of the teeth 11 of the lower cutting blade may be provided with notches 12, to facilitate the cutting operation.

While my improved shears are especially adapted for cutting or trimming hedges it will be understood that they may be employed in any connection where they are useful. It will also be observed that the construction of the shears is such that the several component parts may be readily disassembled, should occasion necessitate, or that either of the cutting blades may be replaced.

From the foregoing description taken in connection with the accompanying drawings, the construction and operation of the invention will be readily understood without requiring a more extended explanation.

As first stated, the object of this invention is to produce a very simple and yet efficient device of the character disclosed. As above described it will be seen that the two blades are held so closely together that their teeth coact, by the same pivotal means which connect them respectively with the handles so that the entire device comprises but five members in addition to the pivots and rivets, and yet every detail is present which is necessary to cause the blades to move in juxtaposition and prevent the parts from becoming disconnected accidentally.

What I claim as my invention is:—

A pair of hedge shears comprising an upper and a lower toothed blade, each blade having a slot at one end and an aperture at the other end, the blades contacting with each other, the slot and aperture of one blade registering with the aperture and slot respectively of the other blade, handles each of which is provided with an extension to contact with the upper blade, bolts inserted through the slots and apertures and also through the extension, and an arm rigidly secured at one end to one of the extensions and pivotally connected at its other end to the other extension whereby the blades are adapted to reciprocate when the handles are operated.

In testimony whereof I have hereunto set my hand in presence of two subscribing witnesses.

HAMILTON SMITH BALLANTINE.

Witnesses:
EDEN M. BALLANTINE,
MARY S. BALLANTINE.

Copies of this patent may be obtained for five cents each, by addressing the "Commissioner of Patents, Washington, D. C."